United States Patent
Kang et al.

(10) Patent No.: US 6,940,572 B2
(45) Date of Patent: Sep. 6, 2005

(54) REFLECTIVE LIQUID CRYSTAL DISPLAY DEVICE AND FABRICATING METHOD THEREOF

(75) Inventors: Won-Seok Kang, Seoul (KR); Woo-Nam Jeong, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 71 days.

(21) Appl. No.: 10/742,918

(22) Filed: Dec. 23, 2003

(65) Prior Publication Data

US 2004/0135943 A1 Jul. 15, 2004

(30) Foreign Application Priority Data

Dec. 30, 2002 (KR) ................ P10-2002-0086522

(51) Int. Cl.[7] ............................................. G02F 1/1335
(52) U.S. Cl. ......................................................... 349/113
(58) Field of Search ........................................ 349/113

(56) References Cited

U.S. PATENT DOCUMENTS 5,408,345 A    4/1995  Mitsui et al.
5,500,750 A    3/1996  Kanbe et al.
2004/0021810 A1 *  2/2004  Kawaguri et al. .......... 349/113

* cited by examiner

*Primary Examiner*—James A. Dudek
(74) *Attorney, Agent, or Firm*—McKenna Long & Aldridge LLP

(57) ABSTRACT

An array substrate for a reflective liquid crystal display device includes: a substrate; a gate line on the substrate; a data line crossing the gate line to define a pixel region; a plurality of convex patterns in the pixel region, each convex pattern having a cross-section with a semicircular shape; an organic insulating layer on the plurality of convex patterns, the organic insulating layer being formed between the gate line and the data line; a thin film transistor connected to the gate line and the data line; an inorganic insulating layer on the organic insulating layer; and a reflective layer on the inorganic insulating layer, the reflective layer having unevenness corresponding to the plurality of convex patterns.

20 Claims, 5 Drawing Sheets

REFLECTIVE LIQUID CRYSTAL DISPLAY DEVICE AND FABRICATING METHOD THEREOF

This application claims the benefit of the Korean Patent Application No. 2002-86522, filed in Korea on Dec. 30, 2002, which is hereby incorporated by reference for all purposes as it fully set forth herein.

BACKGROUND OF THE INVENTION

1. Field of the Invention

The present invention relates to a liquid crystal display device, and more particularly, to a reflective liquid crystal display device having an uneven reflective layer and a fabricating method thereof.

2. Discussion of the Related Art

Generally, reflective liquid crystal display (LCD) devices use ambient light while transmissive LCD devices use light from a backlight unit. Accordingly, reflective LCD devices are more compact than transmissive LCD devices. However, because light is not effectively controlled in reflective LCD devices, brightness degrades as the viewing angle increases due to decreasing reflectance. To overcome this problem, an uneven reflective layer is formed. Because light is scattered at the uneven reflective layer, the viewing angle and brightness are improved.

FIG. 1 is a schematic plane view of an array substrate of a reflective liquid crystal display device according to the related art. As shown in FIG. 1, a gate line 12 is formed on a substrate 10 and a data line 26 crosses the gate line 12. A pixel region "P" is defined by the intersection of the gate line 12 and the data line 26. A thin film transistor (TFT) "T" including a gate electrode 14, an active layer 18 and source and drain electrode 22 and 24 is connected to the gate line 12 and the data line 26. A metal pattern 27 with an island shape is formed over the gate line 12. A storage capacitor "$C_{st}$" using a portion of the gate line 12 as a first electrode and the metal pattern 27 as a second electrode is formed at one side of the pixel region "P." A reflective electrode 32 contacting the drain electrode 24 is formed in the pixel region "P." The reflective electrode 32 has unevenness "A." To form the unevenness "A" of the reflective electrode 32, an insulating layer (not shown) may be formed to have a first unevenness on its surface and the reflective electrode 32 may be formed on the insulating layer to have a second unevenness corresponding to the first unevenness.

FIG. 2 is a schematic cross-sectional view, which is taken along a line "II—II" of FIG. 1, showing a reflective liquid crystal display device according to the related art. As shown in FIG. 2, a reflective LCD device 9 includes first and second substrates 10 and 30 facing and spaced apart from each other, and a liquid crystal layer 40 interposed therebetween. The first substrate 10 includes a pixel region "P" and a TFT "T" is formed at a portion adjacent to the pixel region "P." The TFT "T" includes a gate electrode 14, an active layer 18, an ohmic contact layer 20, a source electrode 22, and a drain electrode 24. The active layer 18 is formed over the gate electrode 14 and the ohmic contact layer 20 is formed on the active layer 18. The source and drain electrodes 22 and 24 contact the ohmic contact layer 20. Even though not shown in FIG. 2, a gate line 12 (of FIG. 1) connected to the gate electrode 14 intersects a data line 26 connected to the source electrode 22 to define the pixel region "P."

A reflective electrode 32 connected to the drain electrode 24 is formed in the pixel region "P." The reflective electrode 32 includes unevenness "A." When ambient light meets the unevenness "A" of the reflective electrode 32, the ambient light does not reflect back along the direction of the ambient light but scatters in various directions. Accordingly, the viewing angle and brightness of the display are improved. The unevenness of the reflective electrode 32 may be obtained by forming a passivation layer 28 to have a first unevenness on its surface and forming the reflective electrode 32 on the passivation layer 28 to have a second unevenness corresponding to the first unevenness. The first unevenness may be formed by patterning an additional photosensitive organic layer on the passivation layer 28.

A color filter layer 34 including red, green, and blue sub-color filters 34a, 34b, and 34c is formed on the second substrate 30. Each of the red, green, and blue sub-color filters 34a, 34b, and 34c corresponds to the pixel region "P." A black matrix 32 is formed between the adjacent sub-color filters, and a common electrode 36 is formed on the color filter layer 34.

However, because the passivation layer 28 under the reflective electrode 32 is formed of an organic material, adhesion between the passivation layer 28 and the reflective electrode 32 is poor. For example, the reflective electrode 32 may be lifted from the passivation layer 28. The lifting of the reflective electrode 32 may cause a distortion of an electric field between the reflective electrode 32 and the common electrode 36 and thus result in a degradation of display quality.

SUMMARY OF THE INVENTION

Accordingly, the present invention is directed to a reflective liquid crystal display device and a fabricating method thereof that substantially obviates one or more of the problems due to limitations and disadvantages of the related art.

An advantage of the present invention is to provide a reflective liquid crystal display device where an interface property between a reflective layer and a passivation layer is improved and a fabricating method thereof.

An advantage of the present invention is to provide a liquid crystal display device having a convex pattern on a substrate, a gate insulating layer of an organic material on the convex pattern, a passivation layer of an inorganic material on the gate insulating layer and a reflective layer on the passivation layer, and a fabricating method thereof.

Another advantage of the present invention is to provide a liquid crystal display device where a reflective layer is simultaneously formed with source and drain electrodes, and a fabricating method thereof.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for a reflective liquid crystal display device includes: a substrate; a gate line on the substrate; a data line crossing the gate line to define a pixel region; a plurality of convex patterns in the pixel region, each convex pattern having across-section with a semicircular shape; an organic insulating layer on the plurality of convex patterns, the organic insulating layer being formed between the gate line and the data line; a thin film transistor connected to the gate line and the data line; an inorganic insulating layer on the organic insulating layer;

and a reflective layer on the inorganic insulating layer, the reflective layer having unevenness corresponding to the plurality of convex patterns.

In another aspect of the present invention, a fabricating method of an array substrate for a reflective liquid crystal display device includes: forming a gate line on a substrate having a pixel region; forming a plurality of convex patterns on the substrate in the pixel region, each convex pattern having a cross-section with a semicircular shape; forming an organic insulating layer on the gate line and the plurality of convex patterns; forming a data line on the organic insulating layer, the data line crossing the gate line; forming a thin film transistor connected to the gate line and the data line; forming an inorganic insulating layer on the thin film transistor and the organic insulating layer; and forming a reflective layer on the inorganic insulating layer, the reflective layer having unevenness corresponding to the plurality of convex patterns.

In another aspect, an array substrate for a reflective liquid crystal display device includes: a substrate; a gate line on the substrate; a data line crossing the gate line to define a pixel region; a plurality of convex patterns in the pixel region, each convex pattern having a cross-section with a semicircular shape; an organic insulating layer on the plurality of convex patterns, the organic insulating layer being in between the gate line and the data line; a thin film transistor connected to the gate line and the data line; a first semiconductor layer on the organic insulating layer in the pixel region; and a reflective layer on the first semiconductor layer, the reflective layer having unevenness corresponding to the plurality of convex patterns.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

In the drawings.

DETAILED DESCRIPTION OF THE EMBODIMENTS

Reference will now be made in detail to the illustrated embodiments of the present invention, examples of which are illustrated in the accompanying drawings.

Figure 1:
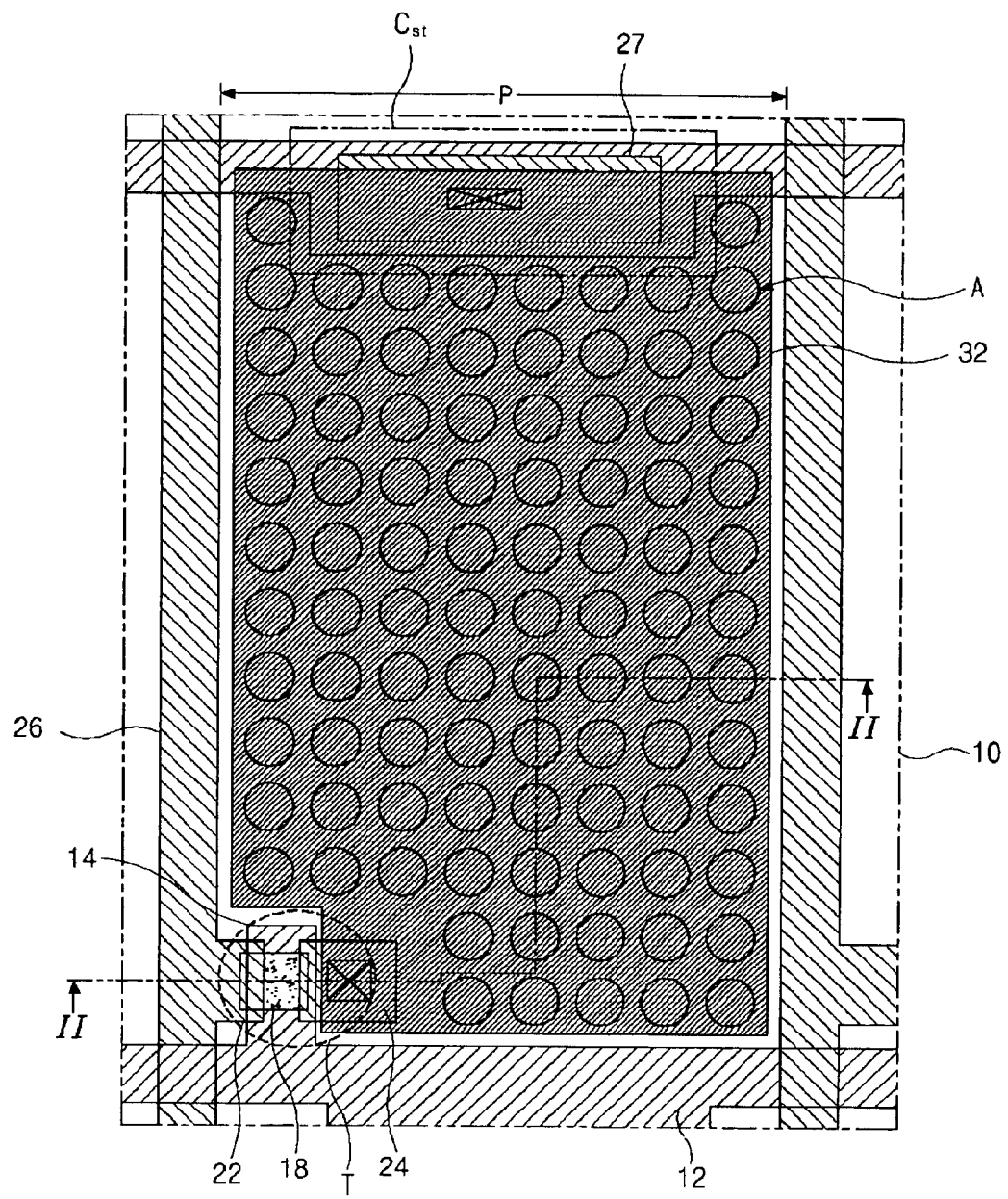
FIG. 1 is a schematic plane view of an array substrate of a reflective liquid crystal display device according to the related art.
Figure 2:
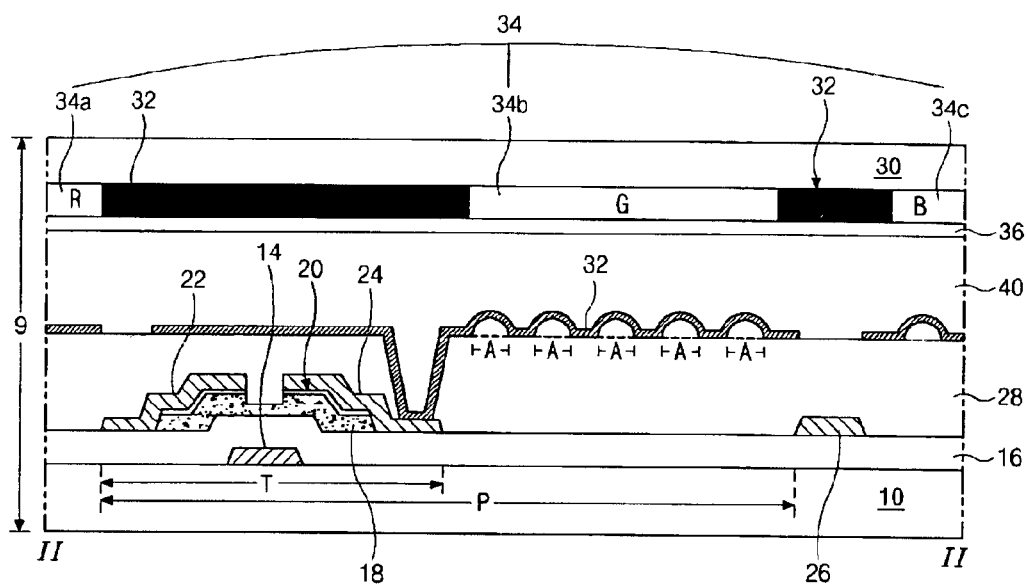
FIG. 2 is a schematic cross-sectional view, which is taken along a line "II—II" of FIG. 1, showing a reflective liquid crystal display device according to the related art.
Figure 3:
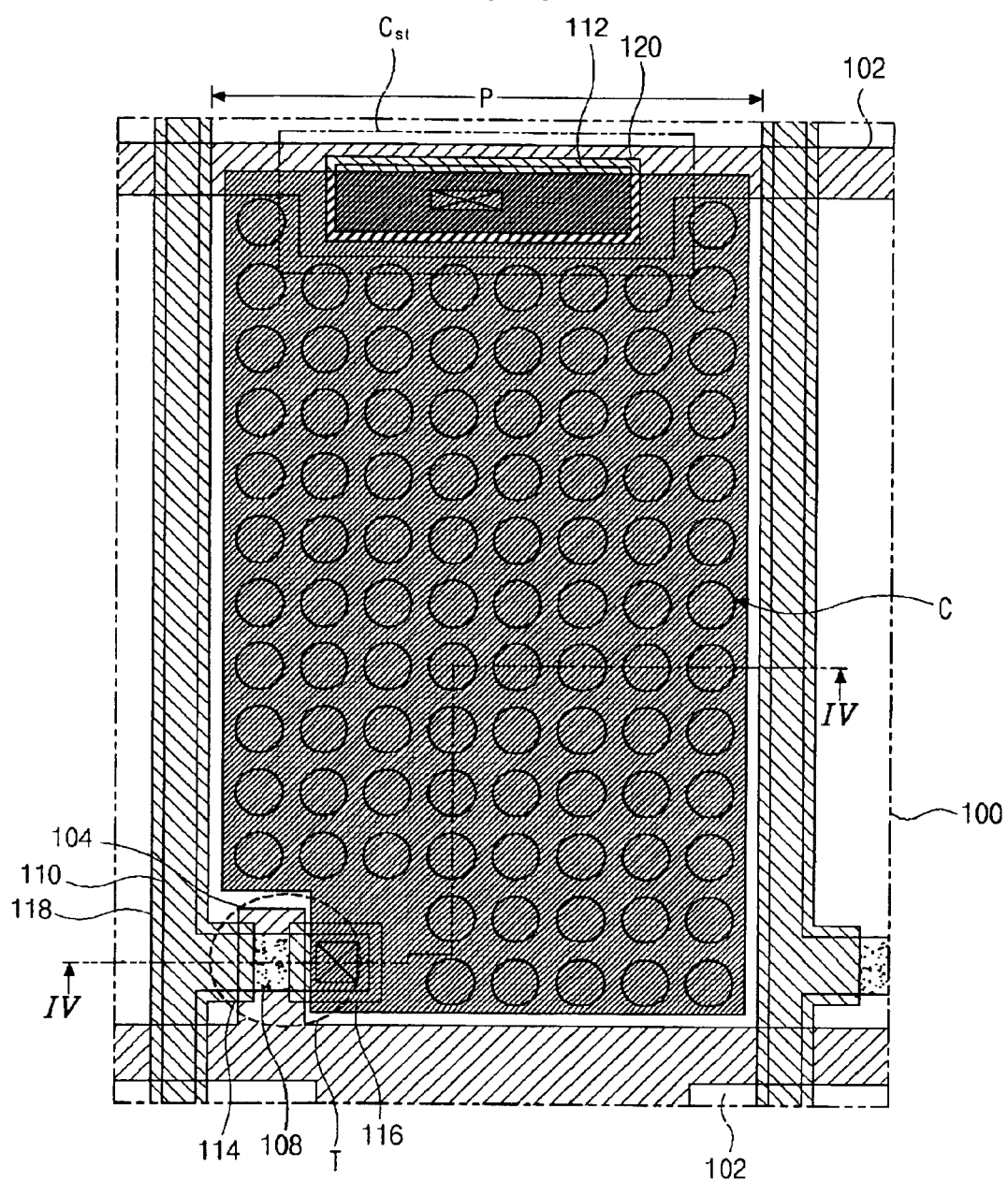
FIG. 3 is a schematic plane view of an array substrate for a reflective liquid crystal display device according to an embodiment of the present invention.

FIG. 3 is a schematic plane view of an array substrate for a reflective liquid crystal display device according to an embodiment of the present invention. In FIG. 3, a gate line 102 is formed on a substrate 100, and a data line 118 intersects the gate line 102 to define a pixel region "P." A thin film transistor (TFT) "T" including a gate electrode 104, a first semiconductor layer 108, a source electrode 114, and a drain electrode 116 is connected to the gate line 102 and the data line 118. A metal pattern 120 with an island shape is formed over the gate line 102. A storage capacitor "$C_{st}$" using a portion of the gate line 102 as a first electrode and the metal pattern 120 as a second electrode is formed at one side of the pixel region "P." A reflective layer 126 contacting the drain electrode 114 is formed in the pixel region "P." Even though not shown in FIG. 3, the reflective layer 126 has unevenness corresponding to a plurality of convex patterns "C" under the reflective layer 126. A second semiconductor layer 110 extending from the first semiconductor layer 108 may be formed under the data line 118 and a third semiconductor layer 112 may be formed under the metal pattern 120 to improve adhesion.

Figure 4:
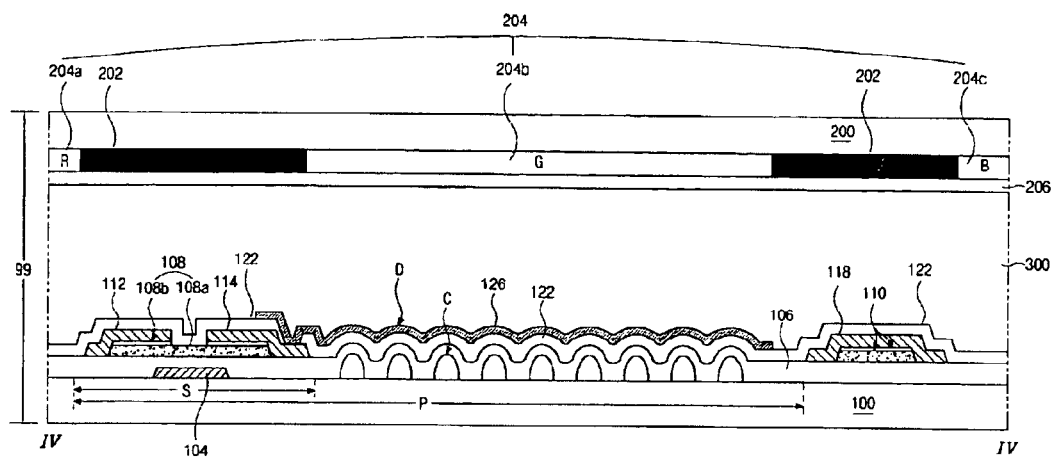
FIG. 4 is a schematic cross-sectional view, which is taken along a line "IV—IV" of FIG. 3, showing a reflective liquid crystal display device according to an embodiment of the present invention.

FIG. 4 is a schematic cross-sectional view, which is taken along a line "IV—IV" of FIG. 3, showing a reflective liquid crystal display device according to an embodiment of the present invention. In FIG. 4, a reflective LCD device 99 includes first and second substrates 100 and 200 facing and spaced apart from each other, and a liquid crystal layer 300 interposed therebetween. A black matrix 202 and a color filter layer 204 including red, green, and blue sub-color filters 204a, 204b, and 204c are formed on an inner surface of the second substrate 200. A common electrode 206 is formed on the color filter layer 204.

The first substrate 100 includes a pixel region "P" and a switching region "S" adjacent to the pixel region "P." A gate electrode 104 is formed on an inner surface of the first substrate 100 in the switching region "S," and a plurality of convex patterns "C" are formed on an inner surface of the first substrate 100 in the pixel region "P." A gate insulating layer 106 of an organic material is formed on the gate electrode 104 and the plurality of convex patterns "C." An active layer 108a of intrinsic amorphous silicon (a-Si:H) is formed on the gate insulating layer 106 over the gate electrode 104 and an ohmic contact layer 108b of impurity-doped amorphous silicon (n+a-Si:H or p+a-Si:H) is formed on the active layer 108a. The active layer 108a and the ohmic contact layer 108b constitute a first semiconductor layer 108. Source and drain electrodes 114 and 116 are formed on the ohmic contact layer 108b.

A gate line 102 (of FIG. 3) is connected to the gate electrode 104 and a data line 118 intersects the gate line 102 (of FIG. 3). A second semiconductor layer 110 extending from the first semiconductor layer 108 may be formed under the data line 118 to improve adhesion. A passivation layer 122 of an inorganic material is formed on the source and drain electrodes 114 and 116. For example, the passivation layer 122 may be formed to have a thickness of about 0.3 μm. A reflective layer 126 contacting the drain electrode 114 is formed on the passivation layer 122 in the pixel region "P."

In the pixel region "P," a plurality of convex patterns "C" may be formed on the first substrate 100. In addition, the gate insulating layer 106 of an organic material is formed on the plurality of convex patterns "C" and the passivation layer 122 of an inorganic material is formed on the gate insulating layer 106. Accordingly, the reflective layer 126 has unevenness "D" corresponding to the plurality of convex patterns "C." Because the reflective layer 126 contacts the passivation layer 122 of an inorganic material instead of the gate insulating layer 106 of an organic material adhesion is improved. As a result, lifting of the reflective layer 126 is prevented.

Further, the second semiconductor layer 110 may be formed between the data line 118 and the gate insulating layer 106 of an organic material and the third semiconductor layer 112 (of FIG. 3) may be formed between the metal pattern 120 (of FIG. 3) and a portion of the gate line 102 (of FIG. 3). The second and third semiconductor layers 110 and 112 prevent lifting of the data line 118 and the metal pattern 120 (of FIG. 3) due to degradation of the adhesion.

FIGS. 5A to 5D are schematic cross-sectional views, taken along a line "IV—IV" of FIG. 3, showing a fabricating process of an array substrate according to an embodiment of the present invention.

Figure 5A:
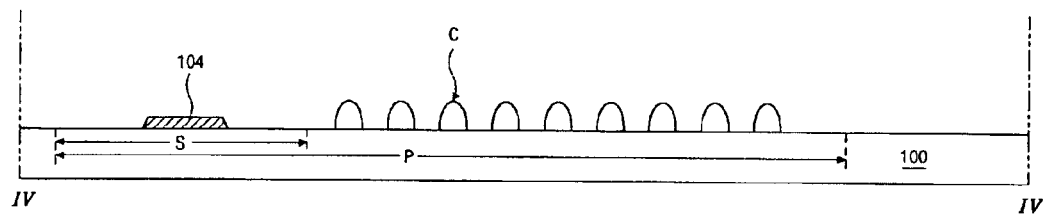
FIGS. 5A to 5D are schematic cross-sectional views, taken along a line "IV—IV" of FIG. 3, showing a fabricating process of an array substrate according to an embodiment of the present invention.

In FIG. 5A, a substrate 100 includes a pixel region "P" and a switching region "S" adjacent to the pixel region "P." A gate line 102 (of FIG. 3) and a gate electrode 104 extending from the gate line 102 (of FIG. 3) are formed on the substrate 100. The gate line 102 (of FIG. 3) and the gate electrode 104 may be formed of a single-layered metal such as aluminum (Al), aluminum alloy including aluminum neodymium (AlNd), tungsten (W), chromium (Cr), and molybdenum (Mo) or a double-layered metal such as aluminum/chromium (Al/Cr) and aluminum/molybdenum (Al/Mo). Because operation of an LCD device strongly depends on the properties of the material used for the gate line 102 (of FIG. 3) and the gate electrode 104, aluminum having low resistivity is widely used to minimize an RC (resistance capacitance) delay. However, pure aluminum has a poor chemical resistance and may cause a line defect due to hillock formation in a subsequent high temperature process. Accordingly, aluminum is used for the gate line 102 (of FIG. 3) and the gate electrode 104 in the form of alloy or double layer.

A plurality of convex patterns "C" are formed on the substrate 100 in the pixel region "P" by coating, patterning, and curing photosensitive resin. The plurality of convex patterns "C" may not be formed in the switching region "S." After the photosensitive resin is coated and patterned, the plurality of convex patterns "C" have a rectangular shape in a cross-sectional view. Top edge portions of each convex pattern "C" having a rectangular shape flow downward when cured using a specific temperature, and each convex pattern "C" becomes a semicircular shape in a cross-sectional view.

Figure 5B:
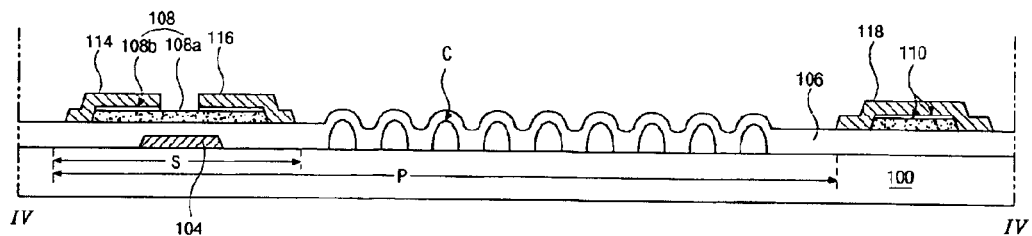

In FIG. 5B, a gate insulating layer 106 is formed on the gate electrode 104, the gate line 102 (of FIG. 3), and the plurality of convex patterns "C" by depositing one of an organic insulating material group including benzocyclobutene (BCB) and acrylic resin. In the pixel region "P," because the gate insulating layer 106 is formed over the plurality of convex patterns "C," the gate insulating layer 106 is uneven.

A first semiconductor layer 108 including an active layer 108a and an ohmic contact layer 108b is formed on the gate insulating layer 106 over the gate electrode 104. The active layer 108a may be formed of intrinsic amorphous silicon (a-Si:H) and the ohmic contact layer 108b may be formed of impurity-doped amorphous silicon (n+a-Si:H or p+a-Si:H). Simultaneously, a second semiconductor layer 110 and a third semiconductor layer 112 (of FIG. 3) are formed on the gate insulating layer 106. The second semiconductor layer 110 extends from the first semiconductor layer 108 along a direction perpendicular to the gate line 102 (of FIG. 3). Even though not shown in FIG. 5B, the third semiconductor layer 112 (of FIG. 3) is formed over a portion of the gate line 102 (of FIG. 3) to have an island shape. Accordingly, the second and third semiconductor layers 110 and 112 (of FIG. 3) have a double-layered structure of intrinsic amorphous silicon (a-Si:H) and impurity-doped amorphous silicon (n+a-Si:H or p+a-Si:H).

Source and drain electrodes 114 and 116 are formed on the first semiconductor layer 108 and a data line 118 is formed on the second semiconductor layer 110 by depositing and patterning a conductive metallic material. The source and drain electrodes 114 and 116 contact the ohmic contact layer 108b and are spaced apart from each other. The source electrode 114 is connected to the data line 118. Even thought not shown in FIG. 5B, a metal pattern 120 (of FIG. 3) having an island shape may be simultaneously formed on the third semiconductor layer 112 (of FIG. 3). A portion of the ohmic contact layer 108b between the source and drain electrodes 114 and 116 is removed so that a channel region of the active layer 108a can be exposed.

Figure 5C:
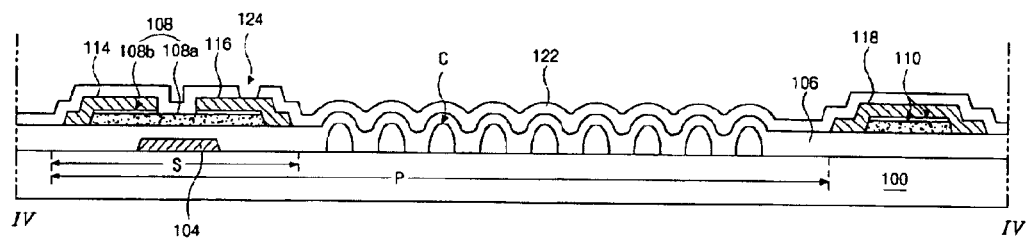

In FIG. 5C, a passivation layer 122 having a drain contact hole 124 and a capacitor contact hole (not shown) is formed on the source electrode 114, the drain electrode 116 and the data line 118 by depositing and patterning one of an inorganic insulating material group including silicon nitride (SiNx) and silicon oxide (SiO$_2$). The drain contact hole 124 and the capacitor contact hole (not shown) expose the drain electrode 116 and the metal pattern 120 (of FIG. 3), respectively. Because the passivation layer 122 is formed over the uneven gate insulating layer 106, the passivation layer 122 is also uneven in the pixel region "P."

Figure 5D:
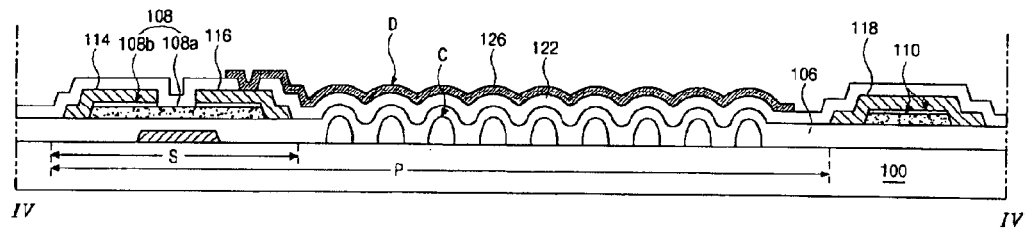

In FIG. 5D, a reflective electrode 126 is formed on the passivation layer 122 by depositing and patterning a conductive metallic material having high reflectance. For example, aluminum (Al), aluminum alloy such as aluminum neodymium (AlNd), or silver (Ag) may be used for the reflective layer 126. The reflective layer 126 is connected to the drain electrode 116 through the drain contact hole 124. Even though not shown in FIG. 5D, the reflective layer 126 may be connected to the metal pattern 120 (of FIG. 3) through the capacitor contact hole (not shown). Because the reflective layer 126 is formed over the uneven passivation layer 122 in the pixel region "P," the reflective layer 126 is also uneven "D."

The use of photo masks in a fabricating process of an array substrate for an LCD device according to an embodiment of the present invention is illustrated as follows.

In a first mask process, a gate electrode and a gate line are formed. In a second mask process, a plurality of convex patterns are formed. In a third mask process, a semiconductor layer including an active layer and an ohmic contact layer is formed. In a fourth mask process, a source electrode, a drain electrode, and a data line are formed. In a fifth mask process, a passivation layer is formed. In a sixth mask process, a reflective layer is formed.

Even though not shown in figures, a reflective layer may directly extend from the drain electrode in another embodiment of the present invention. In this embodiment, a passivation layer of an inorganic insulating material may be omitted and an additional semiconductor layer may be formed under the reflective layer to improve the adhesion of the reflective layer. Thus, the number of mask processes may be reduced.

Consequently, a reflective LCD device according to the present invention has following advantages. First, because a reflective layer is formed on a passivation layer of an inorganic insulating material or a semiconductor layer of amorphous silicon, which has excellent adhesion with a metallic material, lifting of the reflective layer can be prevented. Second, because a plurality of convex patterns are formed on a substrate before forming a TFT, an uneven reflective layer can be more stably obtained. Therefore, the light scattering at the reflective layer is maximized, and viewing angle and brightness are improved.

It will be apparent to those skilled in the art that various modifications and variations can be made in a reflective liquid crystal display device and a fabricating method thereof of the present invention without departing from the spirit or scope of the invention. Thus, it is intended that the present invention cover the modifications and variations of this invention provided they come within the scope of the appended claims and their equivalents.

What is claimed is:

1. An array substrate for a reflective liquid crystal display device, comprising:
    a substrate;
    a gate line on the substrate;
    a data line crossing the gate line to define a pixel region;
    a plurality of convex patterns in the pixel region, each convex pattern having a cross-section with a semicircular shape;
    an organic insulating layer on the plurality of convex patterns, the organic insulating layer being in between the gate line and the data line;
    a thin film transistor connected to the gate line and the data line;
    an inorganic insulating layer on the organic insulating layer; and
    a reflective layer on the inorganic insulating layer, the reflective layer having unevenness corresponding to the plurality of convex patterns.

2. The substrate according to claim 1, wherein the inorganic insulating layer covers the thin film transistor.

3. The substrate according to claim 1, wherein the thin film transistor includes a gate electrode, a first semiconductor layer, a source electrode, and a drain electrode.

4. The substrate according to claim 3, wherein the first semiconductor layer includes an active layer of intrinsic amorphous silicon and an ohmic contact layer of impurity-doped amorphous silicon.

5. The substrate according to claim 3, wherein the organic insulating layer is in between the gate electrode and the first semiconductor layer.

6. The substrate according to claim 5, wherein the inorganic insulating layer includes a drain contact hole exposing the drain electrode.

7. The substrate according to claim 6, wherein the reflective layer is connected to the drain electrode through the drain contact hole.

8. The substrate according to claim 3, further comprising a second semiconductor layer between the organic insulating layer and the data line, the second semiconductor layer extending from the first semiconductor layer.

9. The substrate according to claim 3, further comprising an island shaped metal pattern on the organic insulating layer over a portion of the gate line to form a storage capacitor.

10. The substrate according to claim 9, further comprising a third island shaped semiconductor layer between the organic insulating layer and the metal pattern, the third semiconductor layer having the same structure as the first semiconductor layer.

11. The substrate according to claim 1, wherein the organic insulating layer includes one of benzocyclobutene (BCB) and acrylic resin.

12. A method of fabricating an array substrate for a reflective liquid crystal display device, comprising:
    forming a gate line on a substrate having a pixel region;
    forming a plurality of convex patterns on the substrate in the pixel region, each convex pattern having a cross-section with a semicircular shape;
    forming an organic insulating layer on the gate line and the plurality of convex patterns;
    forming a data line on the organic insulating layer, the data line crossing the gate line;
    forming a thin film transistor connected to the gate line and the data line;
    forming an inorganic insulating layer on the thin film transistor and the organic insulating layer; and
    forming a reflective layer on the inorganic insulating layer, the reflective layer having unevenness corresponding to the plurality of convex patterns.

13. The method according to claim 12, wherein the thin film transistor includes a gate electrode, a first semiconductor layer, a source electrode and a drain electrode.

14. The method according to claim 13, wherein the organic insulating layer is formed between the gate electrode and the first semiconductor layer.

15. The method according to claim 13, further comprising forming a second semiconductor layer between the organic insulating layer and the data line.

16. The method according to claim 15, further comprising forming an island shaped metal pattern on the organic insulating layer over a portion of the gate line.

17. The method according to claim 16, further comprising forming a third island shaped semiconductor layer between the organic insulating layer and the metal pattern.

18. The method according to claim 17, wherein the first semiconductor layer, the second semiconductor layer, and third semiconductor layer are simultaneously formed.

19. An array substrate for a reflective liquid crystal display device, comprising:
    a substrate;
    a gate line on the substrate;
    a data line crossing the gate line to define a pixel region;
    a plurality of convex patterns in the pixel region, each convex pattern having a cross-section with a semicircular shape;
    an organic insulating layer on the plurality of convex patterns, the organic insulating layer being in between the gate line and the data line;
    a thin film transistor connected to the gate line and the data line;
    a first semiconductor layer on the organic insulating layer in the pixel region; and
    a reflective layer on the first semiconductor layer, the reflective layer having unevenness corresponding to the plurality of convex patterns.

20. The substrate according to claim 19, wherein the thin film transistor includes a gate electrode, a second semiconductor layer, a source electrode, and a drain electrode, and wherein the first semiconductor layer extends from the second semiconductor layer and the reflective electrode extends from the drain electrode.

* * * * *